United States Patent
Dandala et al.

(10) Patent No.: US 10,318,634 B2
(45) Date of Patent: *Jun. 11, 2019

(54) ENHANCING QA SYSTEM COGNITION WITH IMPROVED LEXICAL SIMPLIFICATION USING MULTILINGUAL RESOURCES

(71) Applicant: International Business Machines Corporation, Armonk, NY (US)

(72) Inventors: Bharath Dandala, White Plains, NY (US); Ravi S. Sinha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,712

(22) Filed: Jan. 2, 2017

(65) Prior Publication Data

US 2018/0189262 A1 Jul. 5, 2018

(51) Int. Cl.
*G06F 17/00* (2019.01)
*G06F 17/27* (2006.01)
(Continued)

(52) U.S. Cl.
CPC .......... *G06F 17/277* (2013.01); *G06F 16/243* (2019.01); *G06F 17/2276* (2013.01); *G06F 17/2795* (2013.01); *G06F 17/2872* (2013.01)

(58) Field of Classification Search
CPC .. G06F 17/27; G06F 17/2735; G06F 17/2785; G06F 17/241; G06F 17/277;
(Continued)

(56) References Cited

U.S. PATENT DOCUMENTS 5,444,617 A * 8/1995 Merialdo .............. G06F 17/274
704/238
5,680,511 A * 10/1997 Baker .................. G10L 15/1815
704/257

(Continued)

OTHER PUBLICATIONS

A. Gadag and B. M. Sagar, "Paraphrase generator using dictionary lookup for Kannada language," 2016 2nd International Conference on Next Generation Computing Technologies (NGCT), Dehradun, 2016, pp. 164-168.*

(Continued)

*Primary Examiner* — Edgar X Guerra-Erazo
(74) *Attorney, Agent, or Firm* — VanLeeuwen & VanLeeuwen; William J. Stock

(57) ABSTRACT

An approach is provided that returns a simplified set of text to a user of a natural language processing (NLP) system with the simplified set of text having a complexity appropriate to the reading level of the user. The approach receives a word that belongs to a first natural language and retrieves a first set of complexity data pertaining to the word in the first natural language. The approach translates the word to one or more translated words, with each of the translated words corresponding to one or more second natural languages. The approach then retrieves sets of complexity data, with the sets of complexity data corresponding to a different translated word. The approach determines a complexity of the word in the first natural language based on an analysis of the first and second sets of complexity data.

9 Claims, 6 Drawing Sheets

(51) Int. Cl.
*G06F 16/242* (2019.01)
*G06F 17/22* (2006.01)
*G06F 17/28* (2006.01)

(58) Field of Classification Search
CPC .... G06F 17/30011; G06F 17/21; G10L 15/00; G10L 15/005; G10L 15/193
See application file for complete search history.

(56) References Cited

U.S. PATENT DOCUMENTS

| | | | | |
|---|---|---|---|---|
| 6,233,546 | B1* | 5/2001 | Datig | G06F 17/271 704/7 |
| 6,285,978 | B1* | 9/2001 | Bernth | G06F 17/2854 704/2 |
| 6,393,389 | B1* | 5/2002 | Chanod | G06F 17/271 704/4 |
| 6,397,174 | B1* | 5/2002 | Poznanski | G06F 17/2735 704/9 |
| 7,593,843 | B2* | 9/2009 | Aue | G06F 17/2818 704/2 |
| 8,090,724 | B1* | 1/2012 | Welch | G06F 17/30616 707/750 |
| 8,458,198 | B1* | 6/2013 | Welch | G06F 17/30616 707/750 |
| 8,755,629 | B2* | 6/2014 | Bever | G06K 9/723 382/275 |
| 8,825,648 | B2 | 9/2014 | Ni et al. | |
| 8,892,423 | B1* | 11/2014 | Danielyan | G06F 17/2785 704/10 |
| 9,524,298 | B2* | 12/2016 | Yu | G06F 17/241 |
| 9,569,729 | B1* | 2/2017 | Oehrle | G06Q 10/063 |
| 2003/0160830 | A1* | 8/2003 | DeGross | G06F 17/2735 715/808 |
| 2004/0138869 | A1* | 7/2004 | Heinecke | G06F 17/2715 704/1 |
| 2006/0069562 | A1* | 3/2006 | Adams | G09B 5/00 704/251 |
| 2007/0238076 | A1* | 10/2007 | Burstein | G09B 7/00 434/156 |
| 2009/0306959 | A1* | 12/2009 | Rappoport | G09B 7/02 704/2 |
| 2010/0131900 | A1* | 5/2010 | Spetalnick | G06F 17/276 715/825 |
| 2011/0087670 | A1* | 4/2011 | Jorstad | G06F 17/277 707/741 |
| 2011/0202332 | A1* | 8/2011 | Abir | G06F 17/2872 704/4 |
| 2011/0202333 | A1* | 8/2011 | Abir | G06F 17/2872 704/4 |
| 2012/0239379 | A1* | 9/2012 | Gershnik | G06F 17/275 704/8 |
| 2012/0290290 | A1 | 11/2012 | Tur et al. | |
| 2013/0047078 | A1* | 2/2013 | Bever | G06K 9/723 715/245 |
| 2013/0238313 | A1 | 9/2013 | Alshinnawi et al. | |
| 2014/0297266 | A1* | 10/2014 | Nielson | A61B 5/162 704/9 |
| 2015/0310002 | A1* | 10/2015 | Yu | G06F 17/241 707/750 |
| 2016/0063879 | A1* | 3/2016 | Vanderwende | G09B 7/00 434/322 |
| 2016/0163228 | A1* | 6/2016 | Nielson | A61B 5/162 704/9 |
| 2016/0306794 | A1* | 10/2016 | Huang | G06F 17/2818 |

OTHER PUBLICATIONS

"List of IBM Patents or Patent Applications Treated as Related," Letter from Leslie A. Van Leeuwen, Jun. 8, 2017, 2 pages.

Dandala et al., "Using Multilingual Lexical Resources to Improve Lexical Simplification," U.S. Appl. No. 15/396,709, filed Jan. 2, 2017, 33 pages.

Dandala et al., "Using Multilingual Lexical Resources to Improve Lexical Simplification," U.S. Appl. No. 15/617,377, filed Jun. 8, 2017, 29 pages.

Dandala et al., "Enhancing QA System Cognition With Improved Lexical Simplification Using Multilingual Resources," U.S. Appl. No. 15/617,407, filed Jun. 8, 2017, 29 pages.

Kakkonen, "TexComp—A Text Complexity Analyzer for Student Texts," International Conference on Interactive Computer Aided Learning (ICL2009), Villach, Austria, Sep. 2009, 8 pages.

Vor Der Bruck et al., "A Readability Checker with Supervised Learning Using Deep Indicators," Intelligent Information and Communication Systems (IICS) Informatica 32, May 2008, pp. 429-435.

Callan et al., Combining Lexical and Grammatical Features to Improve Readability Measures for First and Second Language Texts, Proceedings of NAACL HLT 2007, Apr. 2007, Rochester, NY, Association for Computational Linguistics, pp. 460-467.

Ortega, "Syntactic complexity in L2 writing: Progress and expansion," Journal of Second Language Writing 29, 2015, pp. 82-94.

Szlachta et al., "Neurocognitive dimensions of lexical complexity in Polish," Brain and Language 121, 2012, pp. 219-225.

Matiello, "Keeping Lexical Complexity in Slang Translation," Lexical Complexity: Theoretical Assessment and Translational Perspectives, 2007, pp. 121-140.

Ahlfeldt et al., "Literature Review on Patient-Friendly Documentation Systems," Semantic Mining—Work Package 27—Deliverable 1, May 2006, 126 pages.

Sinha, "Finding Meaning in Context using Graph Algorithms in Mono-and Cross-Lingual Settings," Dissertation prepared for the Degree of Doctor of Philosophy, University of North Texas, May 2013, 110 pages.

Niavigli et al., "Joining forces pays off: Multilingual joint word sense disambiguation," Proceedings of the 2012 joint conference on empirical methods in natural language processing and computational natural language learning, Association for Computational Linguistics, Jul. 2012, 13 pages.

Specia et al., "English Lexical Simplification," Google Group, Apr. 2012, 2 pages.

"List of IBM Patens or Patent Applications Treated as Related," Letter from Leslie A. Van Leeuwen, Jan. 2, 2017, 1 page.

Dandala et al., "Using Multilingual Lexical Resources to improve Lexical Simplification," U.S. Appl. No. 15/369,709, filed Jan. 2, 2017, 33 pages.

* cited by examiner

US 10,318,634 B2

ENHANCING QA SYSTEM COGNITION WITH IMPROVED LEXICAL SIMPLIFICATION USING MULTILINGUAL RESOURCES

BACKGROUND OF THE INVENTION

Description of Related Art

Lexical Simplification is a sub-task of text simplification. It can be defined as any lexical substitution task that reduce text complexity. Lexical simplification is a challenging yet useful topic within natural language processing. It has utility in any online system that needs to be accessed by people of non-native proficiency in the language. The Internet is becoming increasingly widespread and increasingly multilingual with different languages, other than English, being proliferated. Typically, in an NLP application the scope is limited to English only.

SUMMARY

An approach is provided that returns a simplified set of text to a user of a natural language processing (NLP) system with the simplified set of text having a complexity appropriate to the reading level of the user. The approach receives a word that belongs to a first natural language and retrieves a first set of complexity data pertaining to the word in the first natural language. The approach translates the word to one or more translated words, with each of the translated words corresponding to one or more second natural languages. The approach then retrieves sets of complexity data, with the sets of complexity data corresponding to a different translated word. The approach determines a complexity of the word in the first natural language based on an analysis of the first and second sets of complexity data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
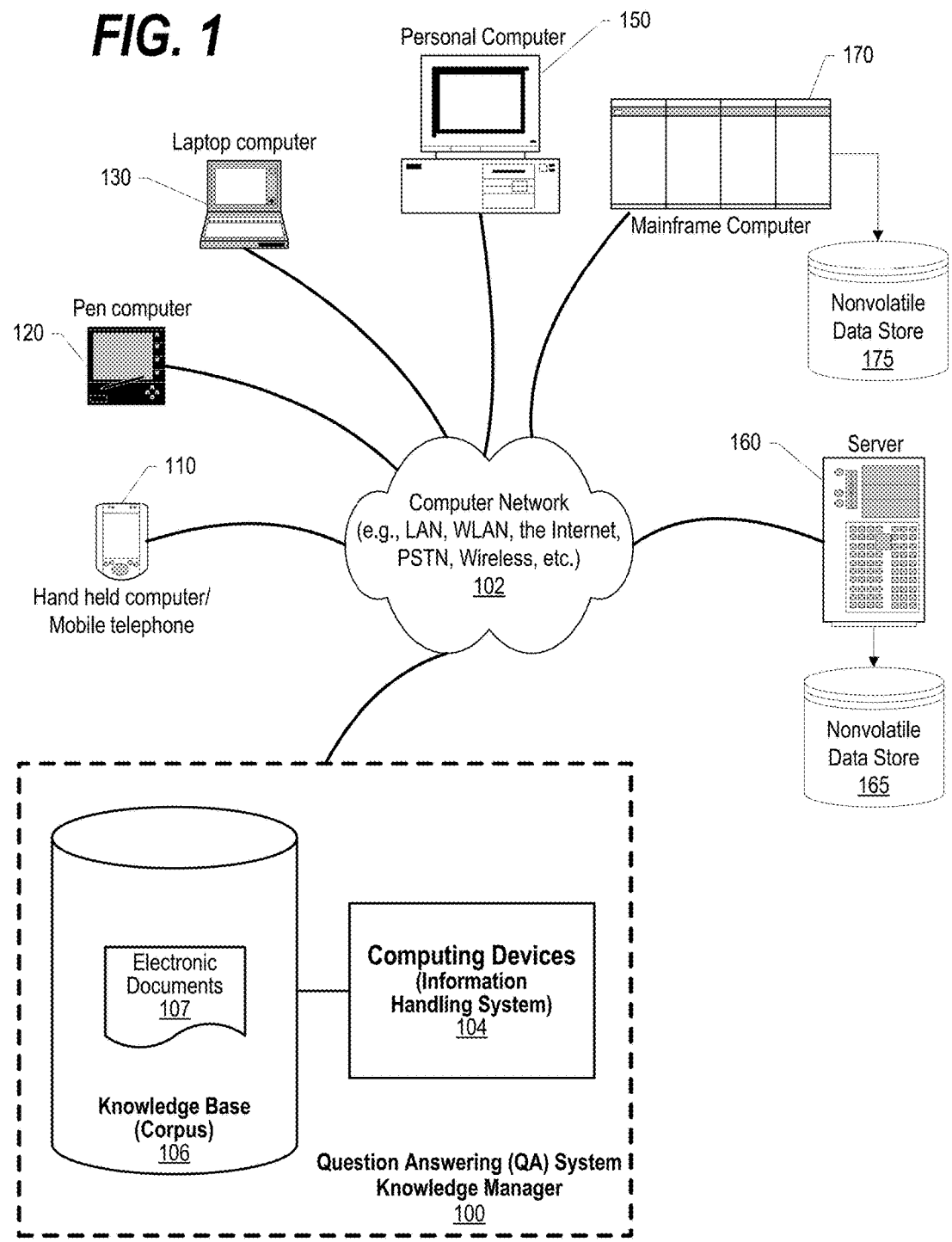
FIG. 1 depicts a network environment that includes a knowledge manager that utilizes a knowledge base.

FIGS. 1-6 describe an approach that relates to natural language processing. Specifically, this approach relates to text or lexical simplification. Lexical simplification is a known task in Natural Language Processing (NLP), and a step in the task is to assess the difficulty or complexity of words or phrases. Current techniques for identifying the complexity of a word or phrase include, for example, term frequency, character length, or number of n-grams. However, these features are based on the word or phrase as used in a single language. This approach proposes a mechanism for identifying the complexity of a word or phrase based on features across multiple languages. The approach calculates multiple features across multiple languages for a given word or phrase based on mapping across languages. Mapping a given word or phase to multiple languages allows for the creation of features such as term frequency, character length and n-grams across languages to get an improved complexity score.

The approach uses (1) the availability of multiple languages (and practically limitless resulting resources), and (2) the fact that words that are synonyms of each other across various languages contain implicit relationships amongst them. In one embodiment, the approach identifies the complexity of words across several languages by using an online encyclopedia in multiple languages, multiple languages to determine the complexity of a word, and multiple features extracted instead of a single feature (e.g., one method: without word sense disambiguation (WSD) and with WSD).

In one embodiment, data collected from the multiple languages pertaining to a given word include (i) the average of the length in characters for a word in multiple languages (this might include all possible translations of the source word in the target language); (ii) the total number of translations of a word in any one language (n features for n languages); (iii) the frequency of the word in English; (iv) the sums of the normalized frequencies of the translations in the n languages; (v) the existence of an online encyclopedia page for the word (e.g., binary 0/1); (vi) the number of translations of the online encyclopedia page in other languages; and (vii) the existence of all possible character n-grams in all possible translations collectively (a vector).

For training, the data labels can be obtained by crowdsourcing to an available service or by using input from a particular group, such as a large set of graduate students. The approach utilizes the collected features pertaining to a word to detect, with a better accuracy, whether a word or a sentence in a given language is simple or difficult. The definition of simple or difficult words and sentences can be used to infer a reading level of the textual content.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

The QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170.

Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
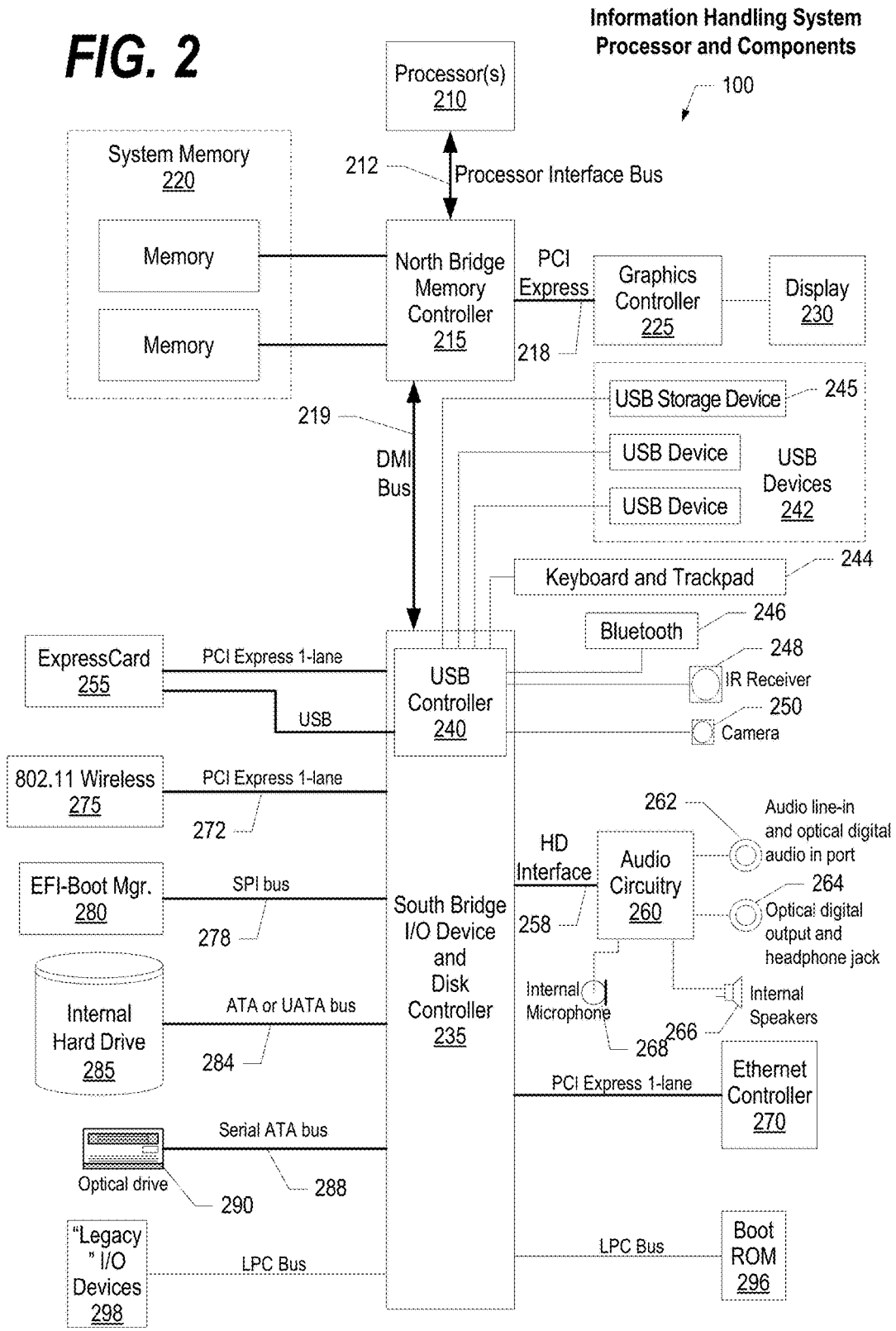
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
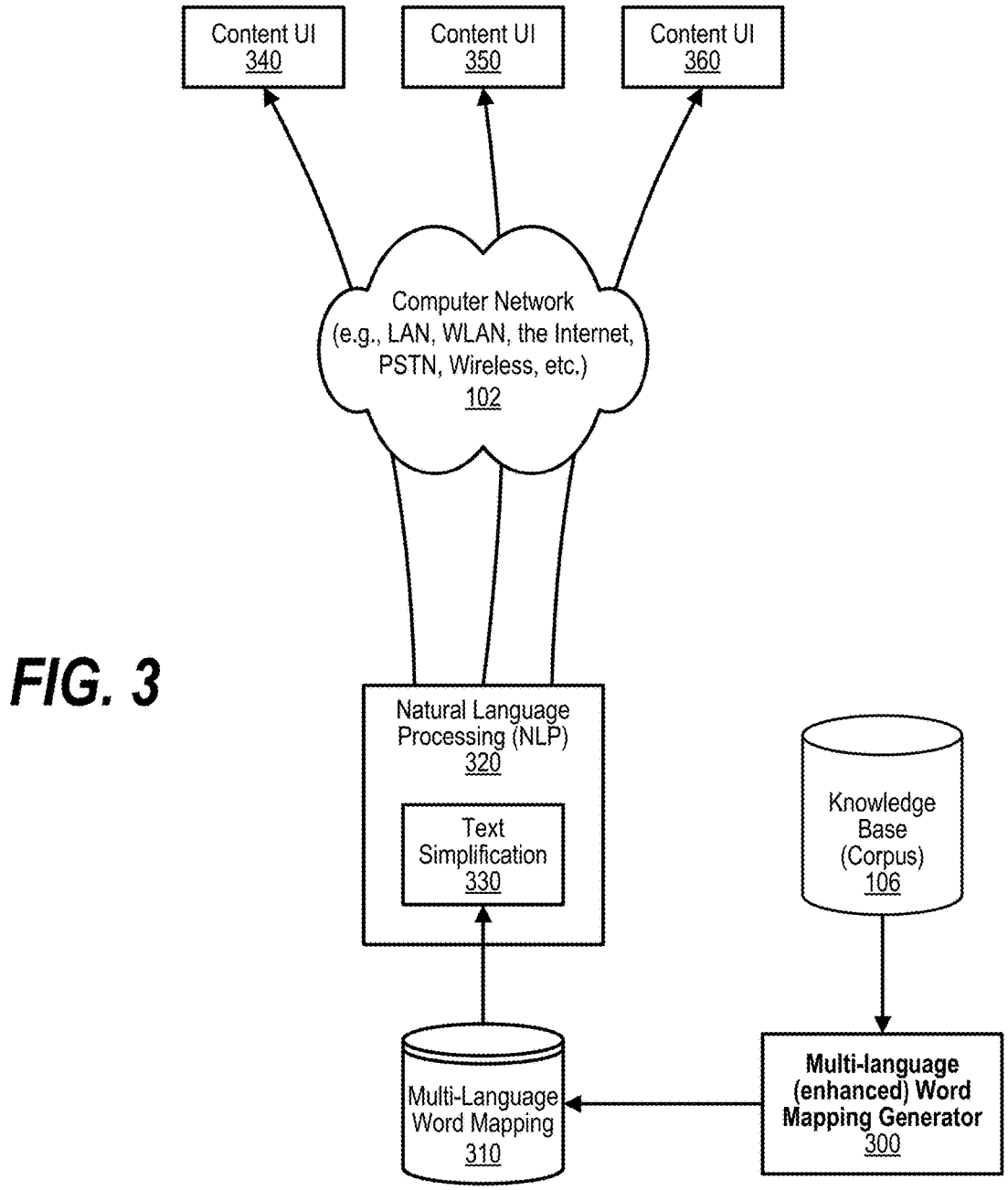
FIG. 3 is a component diagram that shows the interaction between components to use multilingual lexical resources for lexical simplification.

FIG. 3 is a component diagram that shows the interaction between components to use multilingual lexical resources for lexical simplification. Multi-language word mapping generator 300 is an enhanced process that determines complexity of individual words using both a first natural language, such as English, and one or more second natural languages, such as French, Spanish, Russian, etc. Multi-language word mapping generator 300 receives words from corpus 106 and generates multi-language word mapping that is stored in data store 310. The multi-language word mapping that is stored in data store 310 indicates a word complexity that was generated by process 300 based on complexity data gathered pertaining to the word that was gathered from the first natural language and each of the second natural languages. For a given word, the process translates the word into one or more translated words that are each evaluated for complexity based on the natural language of the translated words. In addition, synonyms of translated words can be obtained and also used to further determine the complexity of the word in the various natural languages.

Natural language processing 320 is a process that communicates with end-users, depicted as content user interfaces (UI) 340, 350, and 360. In order to simplify the text that is returned, such as keeping the text in an appropriate "grade level," natural language processing 320 utilizes text simplification process 330. Text simplification process retrieves word complexity data pertaining to the words that are about to be returned to end users to ascertain whether the words being returned are appropriate for the end-users. For example, if one of the end users is known to be a grade school child with a third-grade reading level, then words with a complexity level appropriate for a third grade child are attempted to be used by the text simplification process. Likewise, if another user that is receiving the same content is known to be a college-graduate in the same field as the field of the content, then more complex words can be used by the text simplification process as this second end user is likely to understand more complex words than the third-grade child.

Figure 4:
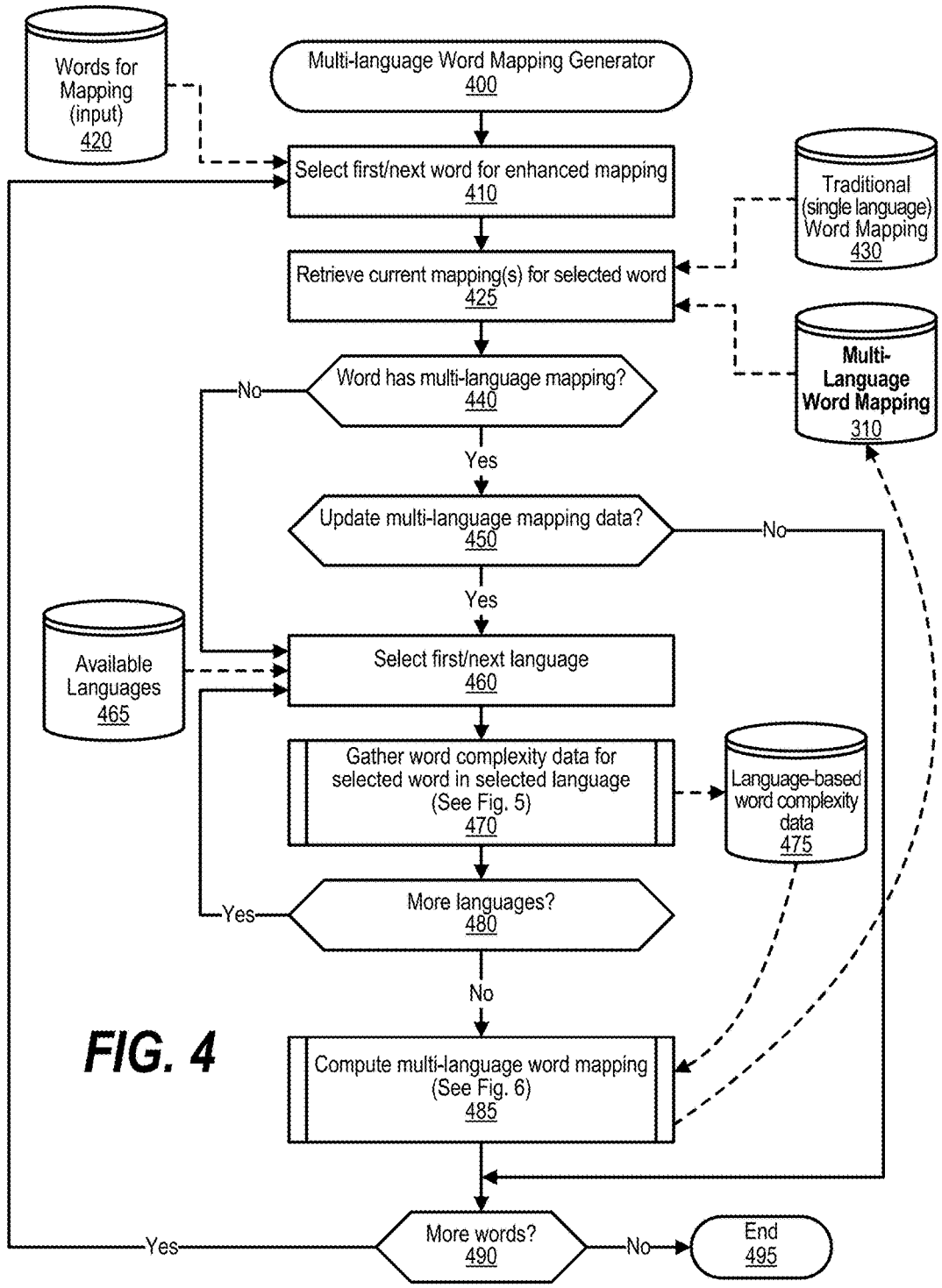
FIG. 4 is a depiction of a flowchart showing the logic used to generate multi-language word mapping.

FIG. 4 is a depiction of a flowchart showing the logic used to generate multi-language word mapping. FIG. 4 processing commences at 400 and shows the steps taken by a process that performs a multi-language word mapping generator. At step 410, the process selects the first word for enhanced mapping. The word is received from data store 420, such as a list of words in a corpus that are to be mapped so that the complexity of such words is better understood. At step 425, the process retrieves the current mapping, or mappings, for the selected word from both traditional word mapping data store 430 which is a single language mapping, and (if available), the current mappings from previous executions of this routine that have been stored in multi-language word mapping data store 310.

The process determines as to whether the selected word already has multi-language mapping data in data store 310 (decision 440). If the selected word already has multi-language mapping data, then decision 440 branches to the 'yes' branch to perform decision 450. On the other hand, if the selected word does not already have multi-language mapping data, then decision 440 branches to the 'no' branch bypassing decision 450. If the selected word already has multi-language mapping data, then the process determines whether to update the multi-language mapping data for the selected word (decision 450). If the process is updating the multi-language mapping data for the selected word, then decision 450 branches to the 'yes' branch to perform steps 460 through 485. On the other hand, if the process is not updating the multi-language mapping data for the selected word, then decision 450 branches to the 'no' branch bypassing steps 460 through 485.

At step 460, the process selects the first natural language from the set of available natural languages which are stored in data store 465. At predefined process 470, the process performs the gather word complexity data for the selected word in selected language routine (see FIG. 5 and corresponding text for processing details). This routine stores language-based word complexity data for the selected language in data store 475. The process determines as to whether there are more languages that are being processed as second natural languages for the selected word (decision 480). If more languages are being processed, then decision 480 branches to the 'yes' branch which loops back to step 460 to select and process the next natural language as described above. This looping continues until all of the natural languages that are being used have been processed, at which point decision 480 branches to the 'no' branch exiting the loop.

Figure 6:
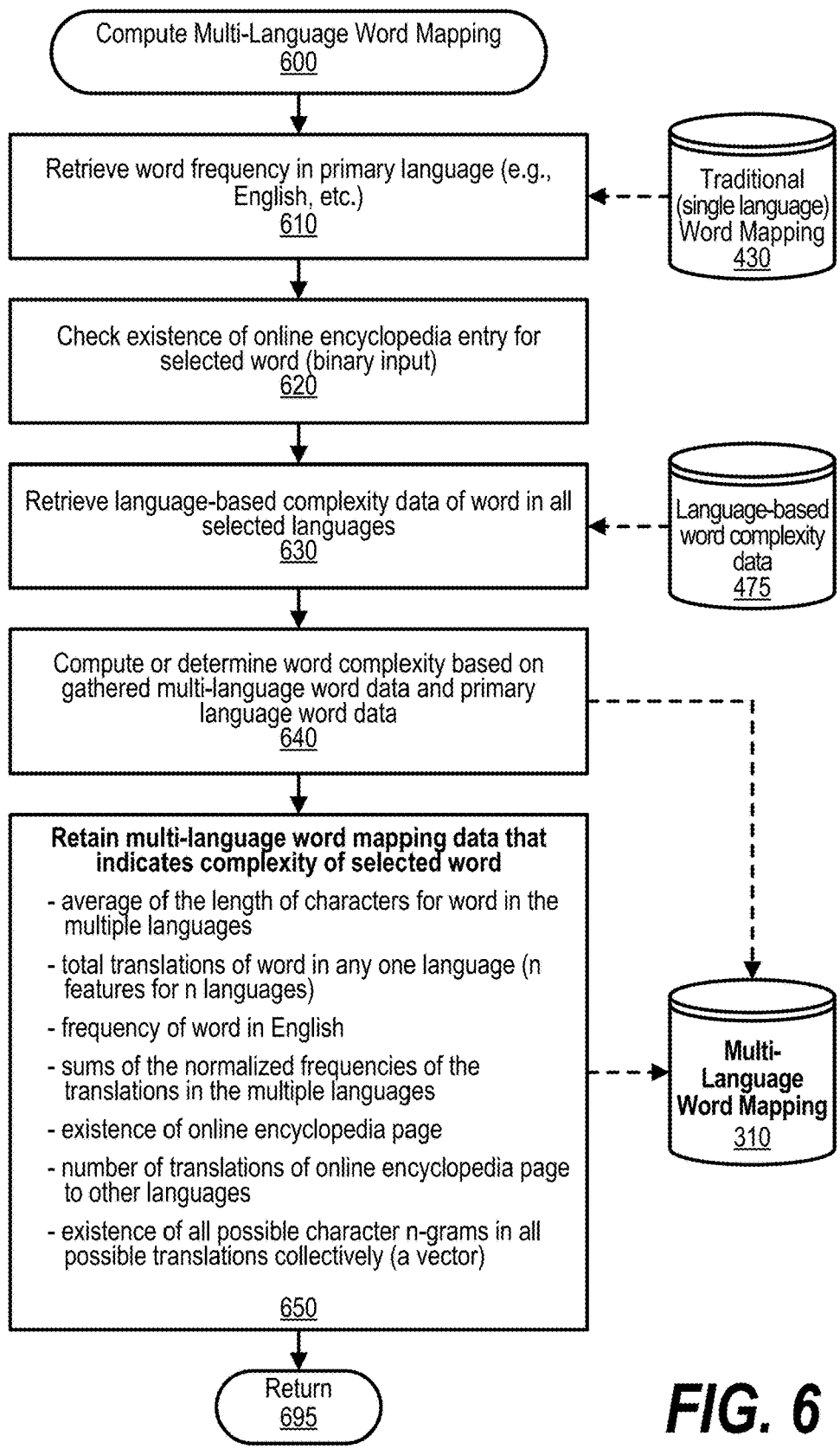
FIG. 6 is a depiction of a flowchart showing the logic used to compute multi-language word mapping for a given word.

At predefined process 485, the process performs the compute multi-language word mapping routine for the selected word (see FIG. 6 and corresponding text for processing details). This routine retrieves the language-based word complexity data from data store 475, computes the multi-language word mapping for the selected word, and stores the result in data store 310. The process determines as to whether there are more words to process (decision 490). If there are more words to process, then decision 490 branches to the 'yes' branch which loops back to step 410 to select and process the next word from data store 420 as described above. This looping continues until there are no more words to process, at which point decision 490 branches to the 'no' branch exiting the loop. FIG. 4 processing thereafter ends at 495.

Figure 5:
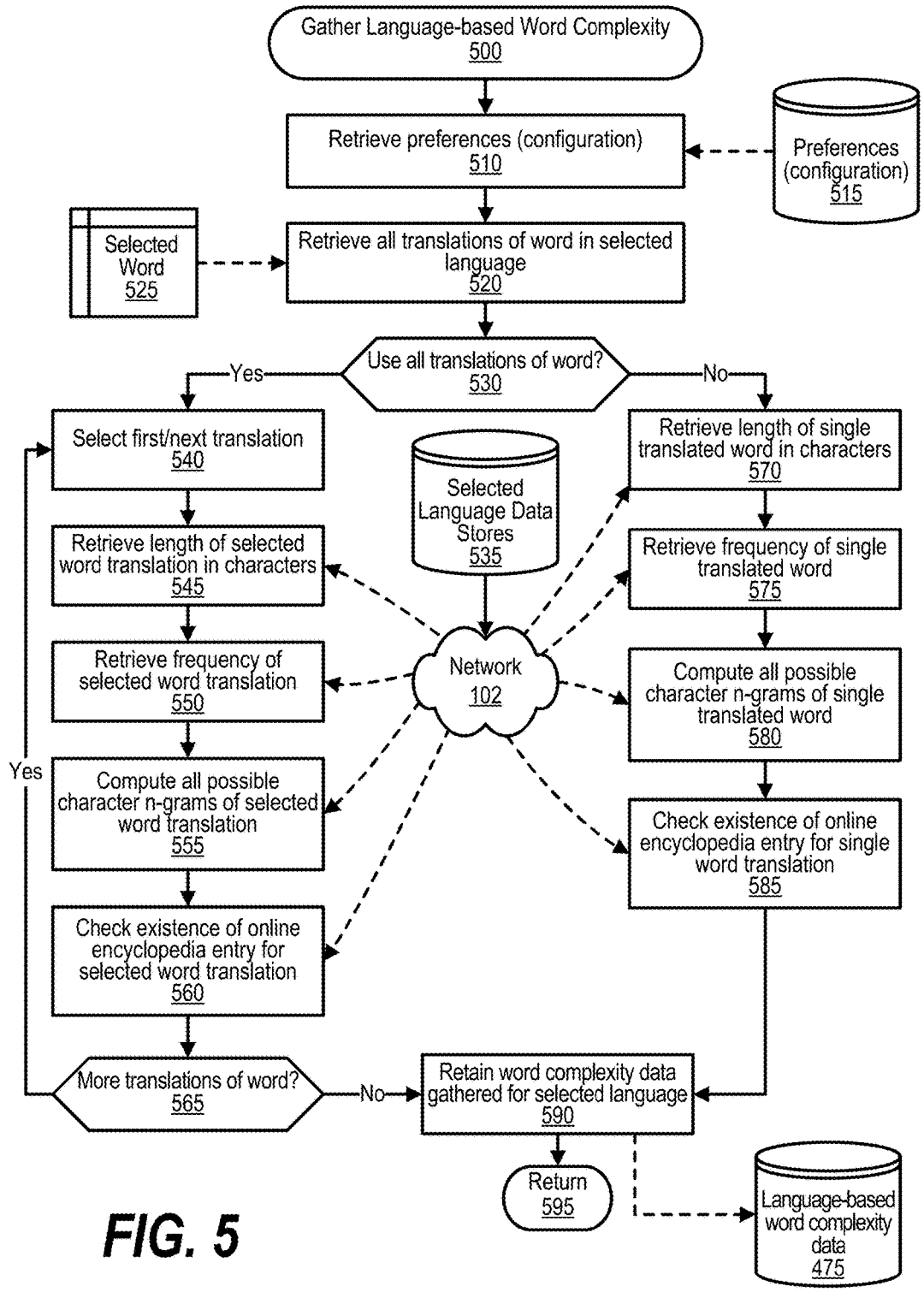
FIG. 5 is a depiction of a flowchart showing the logic used to gather language-based word complexity.

FIG. 5 is a depiction of a flowchart showing the logic used to gather language-based word complexity. FIG. 5 processing commences at 500 and shows the steps taken by a process that gathers language-based word complexity data for a given natural language. At step 510, the process retrieves preferences (configuration data) from data store 515. This preference data indicates whether the routine is processing all translations of the word in the selected second natural language or a single translation of the word. At step 520, the process retrieves all translations of the word in the selected language with the selected language being a primary, or first, natural language such as English, or a second natural language such as French, Spanish, Russian, etc. The selected word is retrieved from memory area 525. The process determines whether all translations of the word are being processed (decision 530). If all translations of the word are being processed, then decision 530 branches to the 'yes' branch to perform steps 540 through 560. On the other hand, if not use all translations of word, then decision 530 branches to the 'no' branch.

If all translations of the word are being processed, then steps 540 through 565 are performed. At step 540, the process selects the first translation for processing. At step 545, the process retrieves the length of selected word from online sources. At step 550, the process retrieves the frequency of the selected word translation from online sources. At step 555, the process computes all possible character n-grams of the selected word translation. Data needed to compute the n-grams is retrieved from online sources. At step 560, the process checks for the existence of an online encyclopedia entry for the selected word translation with the existence being a Boolean (yes/no) value. The process determines as to whether there are more translations of the word need to be processed (decision 565). If there are more translations of the word, then decision 565 branches to the 'yes' branch which loops back to step 540 to select and process the next translation as described above. This looping continues until translations have been processed, at which point decision 565 branches to the 'no' branch exiting the loop.

If only a single translation of the word is being processed (in the first or primary natural language), then steps 540 through 565 are performed. At step 570, the process identifies the length of the single translated word in characters. At step 575, the process retrieves the frequency of the single word from online sources. At step 580, the process computes all possible character n-grams of single translated word. Data needed to compute the n-grams is retrieved from online sources. At step 585, the process checks existence of online encyclopedia entry for the word with the existence being a Boolean (yes/no) value. At step 590, the process retains the word complexity data gathered by either steps 540 through 560 or steps 570 through 585 in data store 474. FIG. 5 processing thereafter returns to the calling routine (see FIG. 4) at 595.

FIG. 6 is a depiction of a flowchart showing the logic used to compute multi-language word mapping for a given word. FIG. 6 processing commences at 600 and shows the steps taken by a process that computes multi-language word mapping for a given word. At step 610, the process retrieves the word frequency in the word's first natural language, such as English, from data store 430. At step 620, the process checks for the existence of an entry of the word in an online encyclopedia with the existence being a binary value (yes/no). At step 630, the process retrieves language-based complexity data of word in all selected languages that was previously gathered by the processing shown in FIG. 5. This data is retrieved from data store 475. At step 640, the process computes, or determines, the word complexity based on the gathered multi-language word data and the primary language word data.

At step 650, the process retains the multi-language word mapping data that indicates complexity of selected word in data store 310. The word mapping data includes the average of the length of characters for the word in the multiple languages including the first natural language and one or more second natural languages. The word mapping data also includes the total translations of the word in any one language (n features for n languages), the frequency of the word in English, the sums of the normalized frequencies of the translations in the multiple languages, the existence of an online encyclopedia page of the word in the primary, or first, natural language, the number of translations of online encyclopedia pages in other natural languages, and a vector value representing all possible character n-grams in all possible translations collectively. FIG. 6 processing thereafter returns to the calling routine (see FIG. 4) at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors; and
   a set of computer program instructions stored in the memory and executed by at least one of the processors to return a simplified set of text to a user of a natural language processing (NLP) system, wherein the simplified set of text comprises text appropriate to a reading level of the user, wherein a lexical simplification process selects the simplified set of text from a corpus of plurality of words that have a complexity level appropriate to the reading level, and wherein the complexity level is based on a multi-language word mapping performed on at least a selected one of the plurality of words using a process comprising:
      creating the multi-language word mapping by a multi-language word mapping generator executing on the information handling system, wherein the creating further comprises:
         retrieving the selected word that belongs to a first natural language;
         retrieving a first set of complexity data pertaining to the selected word in the first natural language, wherein the first set of complexity data comprises a first word length and a first word frequency;
         translating the selected word to one or more translated words, wherein each of the translated words corresponds to one or more second natural languages;
         retrieving one or more second sets of complexity data, wherein each of the second sets of complexity data correspond to a different one of the translated words, and wherein the one or more second sets of complexity data comprises one or more second word lengths and one or more second word frequencies;
         computing a complexity of the selected word in the first natural language based on an overall word length and an overall word frequency, wherein the overall word length is based on the first word length and the one or more second word lengths, and wherein the overall word frequency is based on the first word frequency and the one or more second word frequencies; and
         storing the computed complexity of the word in the multi-language word mapping; and
      wherein the lexical simplification process selects, based on the computed complexity of the word, one of the one or more translated words to replace the selected word.

2. The information handling system of claim 1 wherein the first set of complexity data includes a first word n-gram of the selected word in the first natural language, wherein the second sets of complexity data includes one or more second word n-grams of the selected word in each of the second natural languages, and wherein the actions further comprise:
   determining an overall word n-gram based on the first word n-gram and the second one or more word n-grams, wherein the complexity of the selected word is based on the overall word n-gram.

3. The information handling system of claim 1 wherein the first set of complexity data includes a first word encyclopedia entry of the selected word in the first natural language, wherein the second sets of complexity data includes one or more second encyclopedia entries of the selected word in each of the second natural languages, and wherein the actions further comprise:
   determining an overall word n-gram based on the first word encyclopedia entry and the second one or more encyclopedia entries, wherein the complexity of the selected word is based on the overall word n-gram.

4. The information handling system of claim 1 wherein the complexity of the selected word is based on an average length of characters of the selected word and the translated words in each of the first and second natural languages, a total number of translated words, a frequency of the selected word in the first natural language, a sum of the normalized frequencies of the one or more translated words in the second natural languages, an existence of an encyclopedia entry of the selected word, a number of encyclopedia entries of the translated words in the second natural languages, and a vector value of possible character n-grams in the second natural languages collectively.

5. The information handling system of claim 1 wherein the translated words include synonyms of the translated words in the second natural languages.

6. A computer program product stored in a non-transitory computer readable storage medium, comprising computer program code that, when executed by an information handling system, performs actions comprising:
   returning a simplified set of text to a user of a natural language processing (NLP) system, wherein the simplified set of text comprises text appropriate to a reading level of the user, wherein a lexical simplification process selects the simplified set of text from a corpus of plurality of words that have a complexity level appropriate to the reading level, and wherein the complexity level is based on a multi-language word mapping performed on at least a selected one of the plurality of words using a process comprising:
      creating the multi-language word mapping by a multi-language word mapping generator executing on the information handling system, wherein the creating further comprises:
         retrieving the selected word that belongs to a first natural language;
         retrieving a first set of complexity data pertaining to the selected word in the first natural language, wherein the first set of complexity data comprises a first word length and a first word frequency;
         translating the selected word to one or more translated words, wherein each of the translated words corresponds to one or more second natural languages;
         retrieving one or more second sets of complexity data, wherein each of the second sets of complexity data correspond to a different one of the translated words, and wherein the one or more second sets of complexity data comprises one or more second word lengths and one or more second word frequencies;

computing a complexity of the selected word in the first natural language based on an overall word length and an overall word frequency, wherein the overall word length is based on the first word length and the one or more second word lengths, and wherein the overall word frequency is based on the first word frequency and the one or more second word frequencies; and storing the computed complexity of the word in the multi-language word mapping; and wherein the lexical simplification process selects, based on the computed complexity of the word, one of the one or more translated words to replace the selected word.

7. The computer program product of claim 6 wherein the first set of complexity data includes a first word n-gram of the selected word in the first natural language, wherein the second sets of complexity data includes one or more second word n-grams of the selected word in each of the second natural languages, and wherein the actions further comprise:

determining an overall word n-gram based on the first word n-gram and the second one or more word n-grams, wherein the complexity of the selected word is based on the overall word n-gram.

8. The computer program product of claim 6 wherein the first set of complexity data includes a first word encyclopedia entry of the selected word in the first natural language, wherein the second sets of complexity data includes one or more second encyclopedia entries of the selected word in each of the second natural languages, and wherein the actions further comprise:

determining an overall word n-gram based on the first word encyclopedia entry and the second one or more encyclopedia entries, wherein the complexity of the selected word is based on the overall word n-gram.

9. The computer program product of claim 6 wherein the complexity of the selected word is based on an average length of characters of the selected word and the translated words in each of the first and second natural languages, a total number of translated words, a frequency of the selected word in the first natural language, a sum of the normalized frequencies of the one or more translated words in the second natural languages, an existence of an encyclopedia entry of the selected word, a number of encyclopedia entries of the translated words in the second natural languages, and a vector value of possible character n-grams in the second natural languages collectively.

* * * * *